(No Model.)

R. M. HUNTER.
VALVE GEAR.

No. 267,534. Patented Nov. 14, 1882.

Attests

Inventor

United States Patent Office.

RUDOLPH M. HUNTER, OF PHILADELPHIA, PENNSYLVANIA.

VALVE-GEAR.

SPECIFICATION forming part of Letters Patent No. 267,534, dated November 14, 1882.

Application filed May 1, 1882. (No model.)

To all whom it may concern:

Be it known that I, RUDOLPH M. HUNTER, of the city and county of Philadelphia, and State of Pennsylvania, have invented an Improvement in Engine Valve-Gear, of which the following is a specification.

My invention has reference to valve-gear for steam-engines; and it consists of two spur-wheels of equal diameter, one of which is secured to the crank-shaft of the engine and the other is provided with the valve-rod crank-pin or eccentric, and supported in suitable stationary bearings, in combination with two intermediate spur-wheels meshing with each other and respectively with the aforementioned spur-wheels, that upon the crank-shaft imparting motion to that having the valve-rod crank-pin through the agency of said intermediate wheels, the latter being connected together by a link, and also respectively arranged to swing about the spur-wheels, and in details of construction, all of which are fully set forth in the following specification and shown in the accompanying drawings, which form part thereof.

The object of my invention is to construct suitable valve-gear by which the engine may be reversed when in motion, brought to rest, or have its cut-off varied, and dispense entirely with eccentrics.

Figure 1:
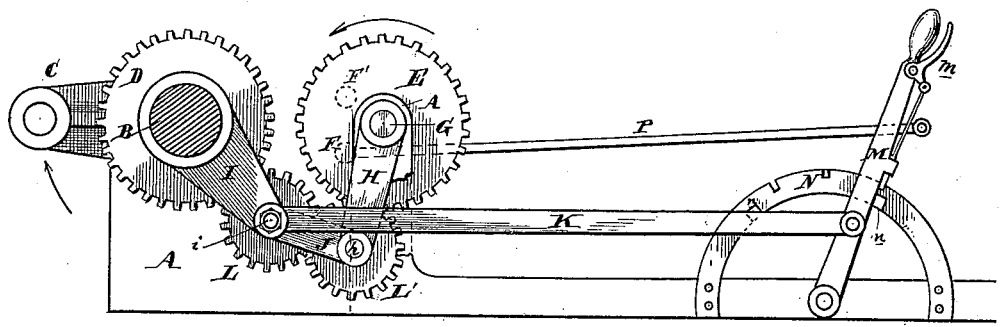
Figure 2:
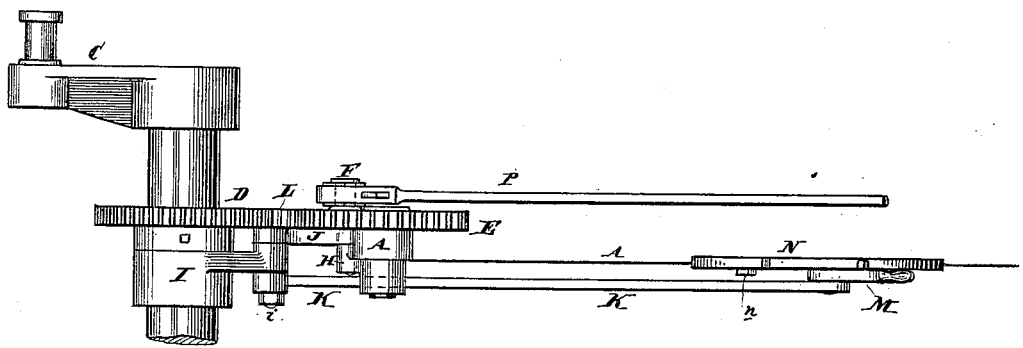

In the drawings, Figure 1 is a side elevation of an engine with the cylinder removed and showing my improved valve-gear, and Fig. 2 is a plan view of same.

A is the bed-plate or frame.

B is the crank-shaft, and C is the crank.

D is a spur-wheel secured fast upon the crank-shaft B.

E is a spur-wheel similar in size to D, carrying the crank-pin F, and is supported upon an axle or shaft, G, carried by the frame A.

L L' are two intermediate spur-wheels, meshing with each other and respectively with wheels D and E. The wheels L L' are connected together by link J, journaled at $i$ and $h$. An arm, H, is journaled to the axle G of the spur-wheel E, and carries on its other end the pin $h$, which in turn carries the intermediate wheel L'. In the same manner an arm, I, loosely hinged to the engine-shaft, carries the pin $i$, which in turn carries the intermediate wheel L. By means of this toggle-joint H J I the intermediate wheels are caused to move about said spur-wheels D and E as centers, at all times meshing with them and with each other.

P is the valve-rod.

M is the reversing-lever, and works on an arc, N, provided with notches and stops $n$ $n$, to limit the throw. The usual catch, $m$, may be used to lock said lever in any desired position. This lever M is connected with the pin $i$ by rod K. If desired, it may be connected to any other part of the toggle-joint.

The operation is as follows: When the engine is running backward, as shown by arrows in Fig. 1, the lever M is drawn back, as shown. Now, to reverse the engine the lever M is pushed forward, causing the intermediate wheels, L L', to travel around the spur-wheels D E, and at the same time turn the wheel E with respect to wheel D, changing its crank-pin to position F'. By moving the lever M half-way the engine will be brought to rest, and any movement less or more than half will vary the cut-off. All of these results are simply accomplished, as they depend only upon changing the relative position of the crank-pin F with reference to the crank C.

I am aware of English Patent No. 13,012 of 1850, and do not claim anything therein set forth and claimed.

Having now described my invention, what I claim as new, and desire to secure by Letters Patent, is—

1. A valve-gear for steam-engines, which consists of two separated spur-wheels of equal diameter, one of which is secured to the engine crank-shaft and the other supported upon a stationary axis, in combination with two intermediate spur-wheels hung from the respective shafts of the spur-wheels, of equal diameter, meshing with each other and respectively with said spur-wheels of equal diameter, and about which they are adapted to move, and mechanism to move said intermediate wheels and hold them in two or more positions, as set forth.

2. In valve-gear for steam-engines, the combination of shaft B with crank C, spur-wheels D E, of equal diameter, intermediate spur-wheels, L L', arms H I, link J, crank-pin F, and valve-rod P, substantially as shown and described.

3. In valve-gear for steam-engines, the combination of shaft B with crank C, spur-wheels D E, of equal diameter, one of which is secured to shaft B and the other carrying crank-pin F, intermediate spur-wheels, L L′, link J, arms H I, valve-rod P, rod K, and means to shift said rod K and lock it in any desired position, substantially as and for the purpose specified.

4. In valve-gear for steam-engines, the combination of shaft B with crank C, spur-wheels D E, of equal diameter, one of which is secured to the shaft B and the other carrying crank-pin F, intermediate spur-wheels, L L′, link J, arms H I, valve-rod P, rod K, lever M, guide N, and stops n n, substantially as and for the purpose specified.

In testimony of which invention I hereunto set my hand.

RUDOLPH M. HUNTER.

Witnesses:
R. S. CHILD, Jr.,
R. A. CAVIN.